US011475214B1

(12) United States Patent
Chacko et al.

(10) Patent No.: US 11,475,214 B1
(45) Date of Patent: Oct. 18, 2022

(54) SYSTEMS AND METHODS FOR AUTO-COMPLETING FIELDS ON DIGITAL FORMS

(71) Applicant: Oracle International Corporation, Redwood Shores, CA (US)

(72) Inventors: Ranjit Joseph Chacko, San Francisco, CA (US); Hugo Alexandre Pereira Monteiro, London (GB); Beat Nuolf, Arvagh (IE); Alberto Polleri, London (GB); Oleg Gennadievich Shevelev, London (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/341,886

(22) Filed: Jun. 8, 2021

(51) Int. Cl.
    *G06F 40/174* (2020.01)
    *G06N 20/00* (2019.01)
    *G06F 3/0482* (2013.01)
    *G06F 3/04847* (2022.01)

(52) U.S. Cl.
CPC .......... *G06F 40/174* (2020.01); *G06F 3/0482* (2013.01); *G06F 3/04847* (2013.01); *G06N 20/00* (2019.01)

(58) Field of Classification Search
CPC .................................................... G06F 40/174
See application file for complete search history.

(56) References Cited

U.S. PATENT DOCUMENTS

| 7,206,998 B2 | 4/2007 | Pennell et al. |
| 7,343,551 B1 * | 3/2008 | Bourdev ................ G06F 40/30 715/224 |
| 7,660,779 B2 | 2/2010 | Goodman et al. |

(Continued)

FOREIGN PATENT DOCUMENTS

| EP | 1777629 | 4/2007 |
| EP | 1986106 A2 * | 10/2008 ........... G06F 17/243 |

OTHER PUBLICATIONS

"Auto Fill eForms Using Artificial Intelligence", ZorroFill, Available Online at: https://www.zorrosign.com/zorrofill/. Accessed from internet on Mar. 18, 2021, 3 pages.

(Continued)

*Primary Examiner* — Asher D Kells
(74) *Attorney, Agent, or Firm* — Kilpatrick Townsend & Stockton LLP

(57) ABSTRACT

Systems and methods described herein relate to determining whether to provide auto-completed values for fields in a digital form. More specifically, for a given field in the digital form, a machine-learning model can be trained to transform an input data set into a predicted field value and can further generate a corresponding confidence metric. A relative-loss parameter can be determined for the field, where the relative-loss parameter represents a loss of responding to an inaccurate predicted field value for the field relative to a loss corresponding to a human user providing a field value for the field. A confidence-metric threshold can be determined for the field based on the relative-loss parameter. For a given (Continued)

Field Entry #1:

Probability of Error in User-Provided Value:    Very Low

Average Cost of Human User to Determine and Enter Value:    Very Low

Probability of Catching Auto-Complete Error before Request Processing:    Very Low Average Cost if Auto-Complete Error Caught before Processing:    Very Low Average Cost if Auto-Complete Error Not Caught before Processing:

usage of the digital form, it can then be determined whether to auto-complete the field with a predicted field value generated by the model by determining whether the corresponding confidence metric exceeds the confidence-metric threshold.

20 Claims, 7 Drawing Sheets

(56) References Cited

U.S. PATENT DOCUMENTS

| | | | | |
|---|---|---|---|---|
| 7,685,144 | B1* | 3/2010 | Katragadda | G06F 40/274 |
| | | | | 707/999.101 |
| 7,849,398 | B2* | 12/2010 | Dabet | G06V 30/1444 |
| | | | | 715/224 |
| 7,890,442 | B2 | 2/2011 | Weir et al. | |
| 8,214,362 | B1* | 7/2012 | Djabarov | G06F 40/174 |
| | | | | 715/224 |
| 9,037,962 | B1* | 5/2015 | Vassar | G06F 40/174 |
| | | | | 715/226 |
| 11,238,223 | B2* | 2/2022 | Nuolf | G06F 8/33 |
| 2005/0257148 | A1* | 11/2005 | Goodman | G06F 40/174 |
| | | | | 715/246 |
| 2007/0256005 | A1 | 11/2007 | Schneider et al. | |
| 2008/0120257 | A1 | 5/2008 | Goyal et al. | |
| 2008/0267505 | A1* | 10/2008 | Dabet | G06V 10/22 |
| | | | | 382/187 |
| 2017/0277770 | A1 | 9/2017 | Singh et al. | |
| 2018/0322418 | A1* | 11/2018 | Jayaraman | G06F 40/40 |
| 2019/0243890 | A1* | 8/2019 | Kwatra | G06F 40/103 |
| 2020/0110795 | A1 | 4/2020 | Gupta et al. | |
| 2020/0394259 | A1 | 12/2020 | Onuma et al. | |
| 2021/0027013 | A1* | 1/2021 | Leme | G06F 40/174 |

OTHER PUBLICATIONS

"ProTip: Use Database Fields to Auto-Fill Your Forms", GoFormz, Available Online at: https://blog.goformz.com/post/protip-use-database-fields-to-auto-fill-your-forms, Jan. 8, 2020, 4 pages.

Bose, "Field Label Prediction for Autofill in Web Browsers", Available Online at: https://arxiv.org/ftp/arxiv/papers/1912/1912.08809.pdf, Dec. 2019, 3 pages.

Davydov et al., "Smart Autofill—Harnessing the Predictive Power of Machine Learning in Google Sheets", Google AI Blog, Available Online at: https://ai.googleblog.com/2014/10/smart-autofill-harnessing-predictive.html, Oct. 13, 2014, 4 pages.

Toda et al., "A Probabilistic Approach for Automatically Filling Form-Based Web Interfaces", *Proceedings of the VLDB Endowment*, vol. 4, No. 3, Available Online at: https://www.vldb.org/pvldb/vol4/p151-toda.pdf, Dec. 2010, pp. 151-160.

* cited by examiner

Field Entry #1:

Estimated Average Time to Determine and Enter Value: `1` minutes

Estimated Average Time to Remedy Incorrect Value: `3` minutes

Field Entry #2:

Estimated Average Time to Determine and Enter Value: `15` minutes

Estimated Average Time to Remedy Incorrect Value: `3000` minutes

FIG. 2A

Field Entry #1:

Probability of Error in User-Provided Value: `Very Low`

Average Cost of Human User to Determine and Enter Value: `Very Low`

Probability of Catching Auto-Complete Error before Request Processing: `Very Low`

Average Cost if Auto-Complete Error Caught before Processing: `Very Low`

Average Cost if Auto-Complete Error Not Caught before Processing:
- Very Low
- Low
- Moderate
- High
- Very High

FIG. 2B

Field Entry #1:

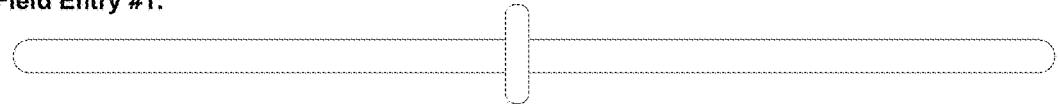

Bias against auto-complete     No bias     Bias toward auto-complete

Field Entry #2:

Bias against auto-complete     No bias     Bias toward auto-complete

FIG. 2C

SYSTEMS AND METHODS FOR AUTO-COMPLETING FIELDS ON DIGITAL FORMS

FIELD

The present application relates generally to systems and methods for selectively auto-completing fields on digital forms. More specifically, the present application relates to systems and methods for facilitating determinations as to a potential loss of responding to erroneous field values relative to an estimated loss of a human operator determining and entering field values and determining whether to auto-complete fields based on the relative losses.

BACKGROUND

Digital forms are frequently used to convey information and/or requests from one entity to another. For example, a form-controlling entity may provide a digital form as part of a webpage that accepts values for a set of fields, where the values identify a type of physical or electronic item (e.g., content, data set, service, product or computation) that is being requested by a requesting user completing the form. When a computation is being requested, the digital form may include fields that accept values that are to be used to perform the computation. The digital form may further include fields that accept values that identifying the requesting user and/or specifics as to when and how the request is to be fulfilled (e.g., by identifying an address or date for delivery).

It may be relatively easy for the requesting user to determine and enter values for some fields. However, determining values for other fields may be more difficult. For example, accurate field values may dependent on identifying dimensions of a space, retrieving electronic or paper records, or performing a controlled analysis on a data set that may potentially even yet to be available. In these circumstances, accurately determining the field values may be time intensive and potentially resource intensive.

Even if determining field values is relatively easy, some requested items may depend on many factors. For example, if a request is for an output of a computation, accurately determining the output may require that hundreds or even thousands of variables. The time required merely to provide these variables via a form (without even considering any time required to determine the variables) may be substantial and burdensome.

Thus, some forms use auto-complete features, where a value for a field is predicted (e.g., based on past entries provided by the requesting user), and the value is automatically populated in a field of a digital form. However, auto-completion is only helpful if the predicted value is accurate. Otherwise, a requesting user may spend more time correcting values than would have been required to enter the values in the first place. Potentially worse yet, if the requesting user fails to detect erroneous auto-completions, a request may be poorly defined and any request-responsive item may differ from the item of actual interest to the requesting user. Similarly, if the requesting user fails to replace an auto-completed value with a more precise value, the request may suffer from having reduced detail.

Thus, there is a need to facilitate provisions of digital forms to efficiently request field values from a requesting user in a manner that maintains the accuracy and precision of information.

SUMMARY

Certain aspects and features of the present disclosure relate to a computer-implemented method for controlling when to provide auto-completed predicted field values in a digital form based on loss assessments. More specifically, a machine-learning model is accessed that transforms an input data set into a predicted field value for a field in a digital form and a corresponding confidence metric. Based on one or more client inputs received from a client device via an interface, a relative-loss parameter is identified for the field that represents a loss of responding to an inaccurate predicted field value for the field relative to a loss corresponding to a human user providing a field value for the field. The loss of responding to the inaccurate predicted field value is based on a predicted time to remedy the inaccurate predicted field value. The loss corresponding to the human user providing the field value is based on a predicted time for determining and entering the field value into the digital form. Based on the relative-loss parameter for the field, a confidence-metric threshold for auto-completion of the field is determined. It is detected that a user device has requested or interacted with the digital form. A particular input data set is accessed, where the particular input data set is associated with the request or interaction. The particular input data set is processed using the machine-learning model to generate: a particular predicted field value for the field; and a particular corresponding confidence metric. It is determined that the particular corresponding confidence metric exceeds the confidence-metric threshold for the field, thereby predicting that a total predicted cost for auto-completion of the field exceeds a total predicted cost for manual entry for the field. In response to the determination, the particular predicted field value is caused to be presented at the user device.

In various embodiments, a computer-program product is provided that is tangibly embodied in a non-transitory machine-readable storage medium. The computer-program product can include instructions configured to cause one or more data processors to perform part or all of a method disclosed herein.

In various embodiments, a system is provided. The system can include one or more data processors and a non-transitory computer readable storage medium containing instructions which, when executed on the one or more data processors, cause the one or more data processors to perform part or all of a method disclosed herein.

The following detailed description together with the accompanying drawings will provide a better understanding of the nature and advantages of the present disclosure.

BRIEF DESCRIPTION OF THE DRAWINGS

Illustrative embodiments of the present invention are described in detail below with reference to the following drawing figures:

FIGS. 2A-2C depict exemplary interfaces that may be generated by and availed by loss collection interface subsystem.

Figure 1:
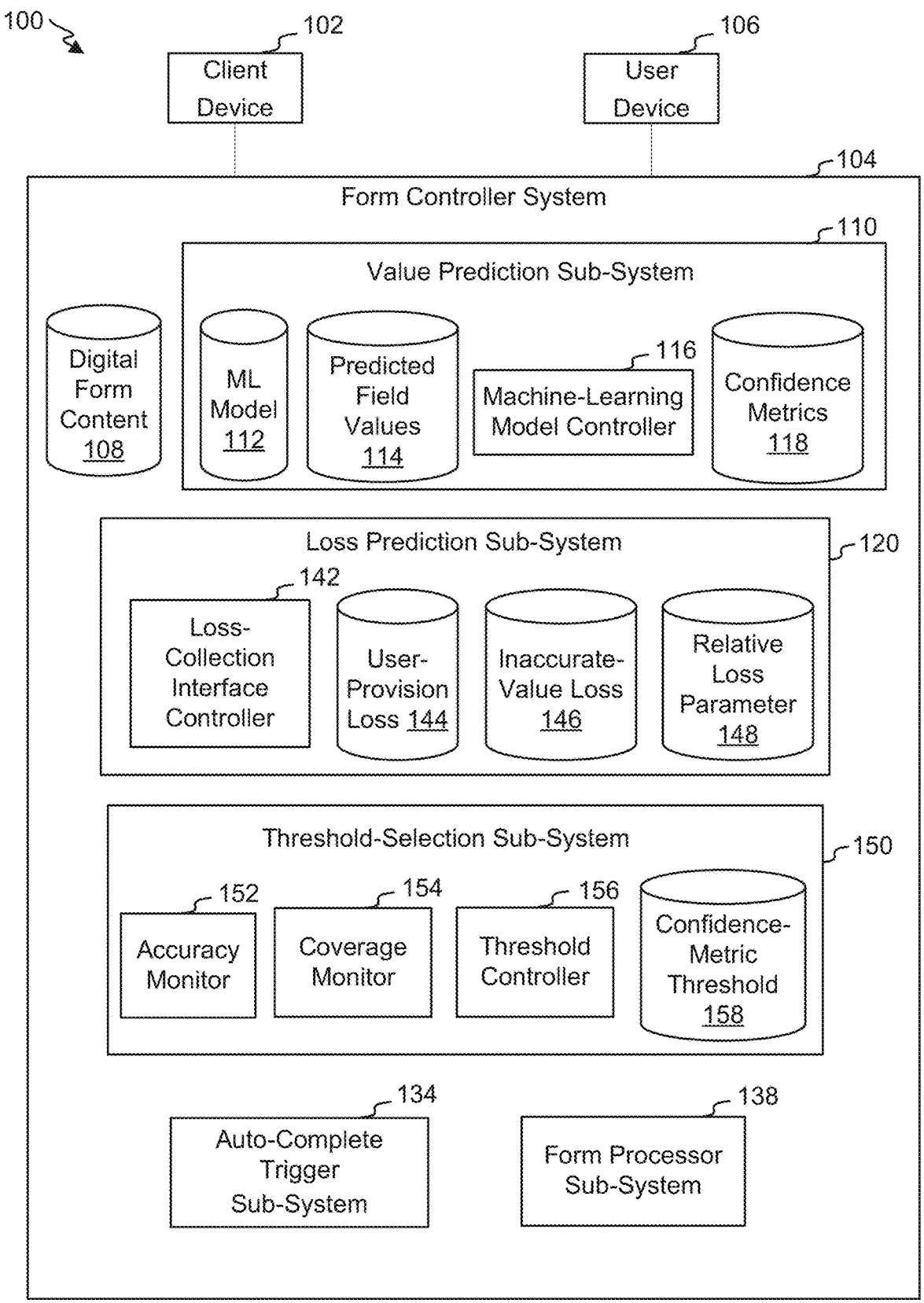
FIG. 1 shows an example network for controlling digital-form auto-completions in accordance with some embodiments of the invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Overview

In some embodiments, systems and methods are provided for intelligently determining whether to provide an auto-completion of a value of a field in a digital form based on a loss function. More specifically, a machine-learning model is trained to predict a value for a field based on an individual input data set and to also predict a confidence that the value is accurate (e.g., accurately depicts a real-world feature or accurately represents a request from a user). A confidence-metric threshold is determined for each field based on a potential loss of an erroneous auto-completed value relative to a potential loss of a user determining and providing a value. For each use case of the digital form and for each field, the machine-learning model associated with field generates the predicted value and confidence metric, and the predicted value is provided in the digital form as an auto-completed value if the confidence metric is above the confidence-metric threshold (and is not provided if the confidence metric is not above the confidence-metric threshold).

Auto-completing a field value has the potential benefit of a saving a user the time of determining what value to provide and to enter the value. For example, if various fields in a digital form request the model, processor speed, and RAM of a computing device, the user may need to locate the device, retrieve the specifications, and then enter the specifications in the form. However, an incorrect auto-completed field value is likely to result in a net time loss. For example, a user may detect that the field value is wrong and may then still need to identify and enter the correct value. As another example, the form may be processed with incorrect values, which may result in initiation of an undesired action (e.g., shipping a replacement part that does not work with the user's device, configuring or selecting a computing accessory that is incompatible with the user's device, etc.). The loss required to remedy these types of situations may include lost time (e.g., communications between a user and company about the issue, shipping a new replacement part, and/or configuring or selecting a new computing accessory) and lost money (e.g., due to needing to pay for additional shipping, a different replacement part, and/or a different computing accessory).

Thus, for each field, the relative-loss parameter is determined that indicates a predicted ratio of a loss of an incorrect auto-completed field value relative to a loss of a user determining and entering the field value. Each relative-loss parameter may be determined based on one or more inputs from a client (e.g., who has defined the digital form, who will be providing the digital form, or who will be processing completed digital forms). The one or more inputs may identify (for example) an estimate of a loss (e.g., time and/or cost) of a user determining and entering a field value and/or an estimate of a loss (e.g., time and/or cost) of an inaccurate field value. For example, a cost of an inaccurate field may include a regulatory fee, one or more shipping fees, and/or a re-listing fee to correct the inaccuracy. The one or more inputs may facilitate calculating a weighted average or net loss based on the probability of various circumstances arising and the loss of each circumstance (e.g., a probability of detecting an erroneous auto-completed value at various stages of completing or processing a digital form and a loss associated with detecting the error at each stage). The one or more inputs may include the relative-loss parameter itself so as to indicate how much higher a loss is for an incorrect auto-completed value relative to a loss of a user determining and providing a value.

The relative-loss parameter for a field is used to determine the confidence-metric threshold for the field. In some instances, the confidence-metric threshold may be defined to be the inverse of the confidence-metric threshold. In some instances, the confidence-metric threshold may be determine based on a threshold-accuracy relationship and/or a threshold-coverage relationship. Each of the threshold-accuracy relationship and the threshold-coverage relationship may be determined using (for example) training or validation data and the machine-learning model associated with the field.

The threshold-accuracy relationship indicates how accuracy of predicted values depend on preliminary confidence-metric thresholds. For example, if a confidence-metric threshold is set at 0.99, then only the predicted values associated with very high confidence values would be provided as auto-completed values, and the accuracy of these provided predicted values would likely be very high. However, if a confidence-metric threshold is set at 0, all predicted values would be provided as auto-completed values, and the accuracy of these provided predicted values would likely be substantially lower.

The threshold-coverage relationship indicates how coverage of predicted values depend on preliminary confidence-metric thresholds. For example, if a confidence-metric threshold is set at 0.99 and if there at least some of the predicted values are associated with lower confidence metrics, the coverage would be less than 1. However, if a confidence-metric threshold is set at 0, the coverage would be 1.

The confidence-metric threshold can be defined as the preliminary confidence-metric threshold that minimizes a function defined based on both the coverage (e.g., relating to a probability that values above a given threshold would be observed), the accuracy, and the relative-loss parameter. For example, a normalized gain function can be defined based on the threshold-accuracy relationship, the threshold-coverage relationship, and the relative-loss parameter, where the normalized gain function is:

$$\text{Gain}_{Nom}(th) = [1 - K*(1 - \text{Accuracy}(th))]*\text{Coverage}(th) \quad \text{Eqn. 1}$$

where K is the relative-loss parameter, and th is the preliminary confidence-metric threshold. The confidence-metric threshold can be defined to be the preliminary confidence-metric threshold at which $Gain_{Norm}$ is at its maximum.

It will be appreciated that other gain functions may be used. For example, the (1−Accuracy(th)) term may be replaced with an Error(th) term that indicates how error or inaccuracy of predicted values depend on preliminary confidence metric thresholds. As another example, the normalized gain function may further include addition of a constant (e.g., (K−1)) and/or multiplication by a factor (e.g., 1/K). As yet another example, the gain function may be defined based on the estimated loss of a user determining and entering a field value and/or the estimated loss of an inaccurate field value instead of being based on the relative-loss parameter.

Because the relative-loss parameter, the threshold-accuracy relationship, and the threshold-coverage relationship may be different across different fields, the confidence-metric threshold may also differ across fields. Further, confidence metrics themselves can differ across fields (e.g., if a first machine-learning model is more confident about a prediction for a first field as compared to how confident a second machine-learning model is about a prediction for a second field). Thus, a digital form may include auto-completed values for only an incomplete subset of fields. Further, which fields are included in the incomplete subset may be different across different uses of the digital form. For example, a first machine-learning model may generate a confidence metric for a first field in a first instance that is above a corresponding confidence-metric threshold but may generate a below-threshold metric for the first field in a second instance.

Assigning field-specific confidence-metric thresholds is advantageous as compared to determining (for example) a confidence metric at a level of the digital form and then either presenting all auto-completed field values or none of the auto-completed field values. Field-specific confidence-metric thresholds provide a benefit of saving a user time and effort for determining and providing select values, while avoiding the possibility of dealing with erroneous auto-completed values for other fields.

Further, determining the confidence-metric thresholds based on the relative-loss parameter (and/or underlying losses) facilitates avoiding the most costly auto-complete errors while capitalizing on more frequent auto-completion convenience for fields where errors are less impactful. Further, determining the confidence-metric threshold based on accuracy and coverage data determined using training or validation data can facilitate increased provision of auto-completed values when such values are generally accurate.

Select Definitions

As used herein, the term "auto-completion" of a field (or to "auto-complete" a field) in a digital form refers to determining a proposed or final value for a field by a computing system (e.g., using a machine-learning model), where part or all of the proposed or final value was not provided by a user during an interaction with the digital form. The auto-completion may include (for example) providing a proposed value for a field before a user has begun to identify a value for the field or completing a partial value provided by a user. The auto-completion may include determining a value for the field and even omitting an identification of the determined value from an interface, such that the value is not presented to the user.

As used herein, the term "value" of a field refers to a number, text, a selection between multiple options, or a category.

As used herein, the term "digital form" refers to a computer interface that includes one or more fields and corresponding input components to accept a value for each field. For example, a field may be identified via text. An input component may include (for example) a text box to receive a textual input, radio buttons, a drop-down menu, a slider scale, etc. The digital form may be presented on one or more screens. For example, a user may see part of the digital form initially and may see the rest of the digital form after scrolling down or advancing to a next page of the digital form. The digital form may be presented on a website, as part of a local software program, etc.

As used herein, the term "accuracy" (or "accurate") refers to whether a predicted value of a field accurately represents the information requested by the field or a percentage or a set of predicted values corresponding to the field that accurately represents the information requested by the field. The accuracy may be determined based on training or validation data. In some instances, accuracy can be objectively determined. For example, a field may request a model and make of a user's car. In some instances, accuracy represents a concept, detail, or request pertaining to a user's thoughts. For example, a field may request what type of service is being requested. It will be appreciated that a predicted value need not necessarily be the same as the value that a user would have provided in order to be accurate. For example, the predicted value may be worded differently than the value provided by the user but may convey the same information and may then be considered as accurate. As another example, the predicted value may represent information that is objectively determined to be accurate, even though the user may have provided an inaccurate value. It will also be appreciated that disclosures herein that relate to accuracy assessments include embodiments that relate to error assessments. For example, a threshold-accuracy relationship may include a relationship between preliminary thresholds and error, where the error is defined to be 1 minus the accuracy, or 100% minus the accuracy.

As used herein, the term "coverage" refers to a probability that a criterion is satisfied for a field. The criterion can be defined to be satisfied when a confidence metric is above a particular confidence-metric threshold or a particular preliminary confidence-metric threshold. The coverage may be determined based on training or validation data. For example, if a preliminary confidence-metric threshold for a field is 0.5, and all confidence metrics of predictions generate for the field using a validation data set are above 0.5, the coverage would be defined to be 100% or 1.0.

Exemplary Network for Controlling Form Auto-Completions

FIG. 1 shows an example network 100 for controlling digital-form auto-completions in accordance with some embodiments of the invention. Network 100 includes a client device 102, form controller system 104, and user device 106. Client device 102 interacts with form controller system 104 to facilitate configuring a digital form and operations pertaining to the digital form. The configured digital form can then be availed to user device 106, which can provide an input value for each of one or more fields and/or may confirm or reject auto-completed values. In some instances, form controller system 104 may be remote from client device 102 and/or user device 106. For example, form controller system 104 may include a cloud server or remote computing system. In some instances, client device 102 and/or user device 106 includes part or all of form controller system 104 (e.g., such that operations relating to determining auto-complete conditions are locally determined at client device 102 and/or operations relating to value-predictions (and/or auto-completions) are performed at user device 106.

Client device 102 may transmit one or more communications to form controller system 104 that identify a set of fields to be included in a digital form and/or one or more specifications pertaining to an input component to receive a value for a corresponding field. For example, a field may be identified via a label (e.g., "Processing Speed:") or a question (e.g., "What is the processing speed of your device?"). An input component specification may identify a type of input component (e.g., text box, radio buttons, pull-down menu, slider bar, etc.), a set of predefined potential responses, and/or a limit on a potential response (e.g., a character limit, numerical limit, or a syntax constraint). Form controller system 104 may store the fields and/or input component specifications in a digital form content data store 108.

Form controller system 104 can include a value prediction sub-system 110 that uses a machine-learning model 112 to generate a predicted field value 114 for each of one, more or all fields in the digital form. Machine-learning model 112 may include (for example) a natural language processing model, a regression model (e.g., a logistic regression model), a neural network, a graph network, a random-forest model, a decision tree, etc. Machine-learning model 112 may be configured to receive an input data set and to output both a predicted field value 114 and a confidence metric 118 corresponding to the predicted field value 114. Predicted field value 114 may include (for example), one or more words, one or more numbers, and/or a selection of a particular option from a set of options. Confidence metric 118 may include a categorical metric or a numeric metric that identifies a confidence of predicted field value 114 being accurate and/or within a given degree of accurate (e.g., with 10% or 5% from an actual metric). Confidence metric 118 may include a number along a defined closed range (e.g., a number between 0 and 1 or between 0 and 100).

An input data set that is processed by a machine-learning model 112 may include automatically detected information and/or information provided by a user of user device 106. For example, an input data set may include automatically detected information including: an IP address of a user device 106, a type of operating system operating at user device 106, a user identifier associated with user device 106, a time of day at which a digital form is being accessed. As another example, an input data set may include information provided a user, such as: an identification of a result of interest (e.g., a mesh-network configuration), an anticipated usage of a network, an anticipated geographical location of a network, etc. An input data set used to generate a predicted value of one field may include one or more values received from user device 106 for one or more other fields. It will be appreciated that an input data set used by a machine-learning model to generate a predicted value of one field may be different from an input data set used by another machine-learning model to generate a predicted value of another field.

Machine-learning model controller 116 may train machine-learning model 112 using a training data set, which may have (for example) been received from client device 102, generated as a result of passive monitoring of inputs, or auto-generated by machine-learning model controller 116 using initial response-distribution assumptions. The training may result in learning one or more parameters of the machine-learning model 112. It will be appreciated that machine-learning model controller 116 may train and/or use different machine-learning models 112 to predict values of different fields. The different machine-learning models 112 may, but need not, be of a same type of model. For example, a logistic regression model may be used to predict a numeric value for one field, whereas a natural language processing model may be used to predict a textual value for another field.

In some instances, machine-learning model controller 116 generates predicted field values 114 for a set of fields associated with a given digital form at substantially the same time. In some instances, machine-learning model controller 116 generates predicted field values 114 for a set of fields at different times. For example, one or more predicted field values 114 may be generated with a digital form is accessed, and one or more other predicted field values 114 may be generated after (for example) a user has provided a value for a specific field, has navigated to a next page of the digital form, etc. In some instances, machine-learning model controller 116 initially calculates a field value for a field but then updates the field value upon detecting entry of another field value or correction of another predicted field value.

Form controller system 104 includes a loss-prediction sub-system 120 that determines one or more losses. Specifically a loss-collection interface controller 142 generates an interface that can be availed to and presented at client device 102 to receive client input that identifies one or more of a user-provision loss, an inaccurate-value loss, and/or a relative loss parameter. The user-provision loss may represent a loss (e.g., representing lost time, added costs, lost subsequent opportunities, etc.) that is associated with a user determining a field value and entering it in a digital form. In some instances, the loss is an estimated time commitment. In some instances, the loss is an estimated monetary amount (e.g., which might be calculated as an predicted hourly rate multiplied by a predicted time commitment). The inaccurate-value loss may represent a loss (e.g., representing lost time, added costs, lost subsequent opportunities, etc.) that is associated with provision of an inaccurate value as an auto-completed value. The inaccurate-value loss may be based on (for example) a probability of detecting the inaccurate value at different stages across processing of the form (or performing an action or task based on the processed form) and an estimate of the time and/or cost of performing remedial actions.

FIGS. 2A-2C depict exemplary interfaces that may be generated by and availed by loss-collection interface controller 142. FIG. 2A depicts an interface that requests that a client identify an estimated average time required for a user to determine and enter a field value (which can be used as a user-provision loss or can be used to determine a user-provision loss). Further, the interface requests that a client identify an estimated average time required for an incorrect field value to be remedied (which can be used as an inaccurate-value loss or can be used to determine an inaccurate-value loss). In this instance, the client responses indicate that determining the value for Field Entry #1 will likely require very little time (1 minute), while determining the value for Field Entry #2 will likely require more time (15 minutes). However, the estimated average time to remedy an incorrect value is substantially longer for Field Entry #2 (3000 minutes) as compared to that of Field Entry #1.

Loss-collection interface controller 142 may define the user-provision loss to be the estimated average time to determine and enter a value or may be define the user-provision loss to be the estimated average time to determine and enter a value multiplied by an average hourly wage of a person likely to be determining and entering the value. Loss-collection interface controller 142 may define the inaccurate-value loss to be the estimated average time to remedy an incorrect value.

FIG. 2B illustrates an exemplary interface that requests selections from multiple pull-down menus to facilitate determining multiple loss values. More specifically, the interface requests responses that identify a probability of a user-provided field value being erroneous, an average (e.g., financial) cost of a user determining and entering a field value, a probability of catching that an auto-completed value is erroneous before processing a request, an average cost of an auto-complete error if the error is caught before processing, and an average cost of an auto-complete error if the error is not caught before processing. In the depicted instance, each of the corresponding input components configured to receive a value is a pull-down menu that identifies multiple potential categorical values.

Loss-collection interface controller 142 may associate each potential categorical value with a numeric value. The associations may be different across different entries. For example, very low, low, moderate, high, and very high may be associated with 0.1, 0.3, 0.5, 0.7, and 0.9 (respectively) for responses to the two probability questions but with $100, $500, $1000, $5000, and $25000 (respectively) for responses to the three cost questions. Loss-collection interface controller 142 can define the user-provision loss to be the product of the numbers associated with the probability of error in user-provided value and the average cost of a human user to determine and enter a value (0.1*$100=$10) and can define the inaccurate-value loss to be a weighted average of the costs of the auto-complete error being/not being caught before processing (0.1*$100+(1−0.1)*$5000=$4510).

In some instances, loss-collection interface controller 142 uses a user-provision loss and an inaccurate-value loss to determine a relative loss parameter. For example, a relative loss parameter may be defined to be an inaccurate-value loss divided by a user-provision loss.

In some instances, loss-collection interface controller 142 includes an input component that requests that a client identify a relative loss parameter or a degree to which the client requests that a given field be presented with an auto-completed value. FIG. 2C shows an exemplary interface that includes field-specific slider bars that request that a client identify an extent to which to bias towards or bias against auto-completion. A relative loss parameter may be generated based on the position of the slider. For example, a slider position at the extreme left side of the slider may be associated with a relative loss parameter of 100, while a slider position at the extreme right side of the slider may be associated with a relative loss parameter of 1, and in between positions may be interpolated using a linear or logarithmic scale.

Loss-collection interface controller 142 can store user-provision losses in a user-provision loss data store 144, inaccurate-value losses in an inaccurate-value loss data store 146, and relative loss parameters in a relative loss parameter data store 148. Each loss and/or relative loss parameter may be stored in association with (for example) an identifier of a digital form and/or an identifier of a field.

Form controller system 104 includes a threshold-selection sub-system 150 that determines a confidence-metric threshold for each of multiple fields in a digital form. The threshold can be determined by assessing accuracies of predicted field values and coverages of various preliminary coverage-metric thresholds.

An accuracy monitor 152 can process part or all of a training data set or validation data set to characterize an accuracy of the predicted field values for a given field as generated by using a machine-learning model 112 associated with the field. Accuracy monitor 152 may assess a predicted value generated by machine-learning model 112 using an accuracy criterion to determine whether the predicted value is accurate. The accuracy criterion may be configured to be satisfied when the predicted value is the same as a value entered by a human user, when the predicted (e.g., numeric) value is within a particular range from a value entered by a human user (e.g., within a 5% tolerance, within a predefined absolute difference, etc.), when an action that would be performed upon processing the digital form is the same regardless of whether the predicted value or a value provided by a human user was used, or when an action that would be performed upon processing the digital form using the predicted value is within a defined degree of difference from an action that would be performed upon processing the digital form using a value provided by a human user.

The part or all of the training data set or validation data set can be defined by a preliminary confidence-metric threshold. More specifically, a vector of preliminary confidence-metric thresholds can be defined to include preliminary confidence-metric thresholds that span a range of potential thresholds. For each preliminary confidence-metric threshold, accuracy monitor 152 can identify predicted values associated with confidence metrics that exceed the preliminary confidence-metric threshold. The accuracy of those predicted values can be determined, and the percentage of those predicted values that were identified as accurate (e.g., for which an accuracy criterion was satisfied) can be associated with the preliminary confidence-metric threshold.

Accuracy monitor 152 may generate a threshold-accuracy relationship based on the accuracies associated with the vector of preliminary confidence-metric thresholds. In some instances, the threshold-accuracy relationship includes the paired preliminary confidence-metric thresholds and corresponding accuracies. In some instances, accuracy monitor 152 fits a function to the paired preliminary confidence-metric thresholds and corresponding accuracies, and the threshold-accuracy relationship is defined to be the function. The function may include (for example) a polynomial function, a logarithmic function, a power function, or an exponential function.

A coverage monitor 154 can process part or all of a training data set or validation data set to characterize a coverage. The coverage identifies the percentage of the predicted field values in the training or validation data set associated with a confidence metric that exceeds a given threshold. Coverage monitor 154 can determine the coverage for each preliminary confidence-metric threshold.

Coverage monitor 154 may generate a threshold-coverage relationship based on the coverages associated with the vector of preliminary confidence-metric thresholds. In some instances, the threshold-coverage relationship includes the paired preliminary confidence-metric thresholds and corresponding coverages. In some instances, coverage monitor 154 fits a function to the paired preliminary confidence-metric thresholds and corresponding coverages, and the threshold-coverage relationship is defined to be the function. The function may include (for example) a polynomial function, a logarithmic function, a power function, or an exponential function.

A threshold controller 156 can determine a coverage-metric threshold for a field based on the relative loss parameter for the field, the threshold-accuracy relationship determined for a field, and/or a threshold-coverage relationship determined for a field. Threshold controller 156 may assess a potential combined loss associated with each of one or more preliminary confidence-metric thresholds. The combined loss may be defined as:

$$L_{combined}(th) = L_{User\text{-}Complete} * (1 - \text{Coverage}(th)) + L_{Auto\text{-}complete} * \text{Error}_{Auto\text{-}complete}(th) * \text{Coverage}(th) \quad \text{Eqn. 2}$$

where $L_{User\text{-}Complete}$ is the loss of a user completing a field value, which may represent time and cost involved in determining a field value and entering a field value into the digital form. Coverage(th) represents the coverage at a given preliminary confidence-metric threshold (th), $L_{Auto\text{-}complete}$ is the loss of a field value being autocompleted, which represents the cost and time involved in correcting an erroneous auto-completed value (at each of one or more form-completion or processing stages), scaled by a probability of detecting the error (at each of the one or more stages). $L_{Auto\text{-}complete}$ may also represent a portion of the time and cost of developing and executing the machine-learning model to generate the predicted value. $\text{Error}_{Auto\text{-}complete}(th)$ represents the percentage of those predicted values associated with confidence metrics above the preliminary confidence-metric threshold that were erroneous.

Threshold controller 156 can evaluate the combined loss function to determine the coverage-metric threshold associated with a lowest combined loss $L_{Combined}$. Rather than attempting to identify a preliminary confidence-metric threshold associated with a minimum combined loss $L_{Combined}$, a Gain equation can be defined in a manner such that a minimum of the $L_{Combined}$ equation should be associated with a same preliminary confidence-metric threshold as is associated with a maximum of the Gain equation. The Gain equation can be defined as $$\text{Gain}_{Absolute}(th) = (L_{User\text{-}complete} - L_{Auto\text{-}Complete} * \text{Error}_{Auto\text{-}Complete}(th)) * \text{Coverage}(th) \quad \text{Eqn. 3}$$

Because accuracy is defined to be one minus the error, the function can be revised to depend on accuracy instead of error. Further, the function can be normalized based on $L_{User\text{-}Complete}$. The function can be rewritten to include the relative loss parameter K (defined to be $L_{Auto\text{-}Complete}$ divided by $L_{User\text{-}Complete}$) instead of the two losses. K thus represents the cost of introducing auto-completion, with values larger than 1 representing a net cost. Finally, (1−K) is subtracted from a numerator to ensure that gain values are constrained to be between 0 and 1. The resulting normalized gain function can be defined as:

$$\text{Gain}(th) = \{[1 - K * (1 - \text{Accuracy}(th))] * \text{Coverage}(th) - (1 - K)\} / K \quad \text{Eqn. 4}$$

for a given field as generated by using a machine-learning model 112 associated with the field.

Threshold controller 156 can thus use Eqn. 5 to find the preliminary confidence-metric threshold associated with a maximum Gain(th) and define the confidence-metric threshold for the field to be that preliminary confidence-metric threshold.

Figure 3:
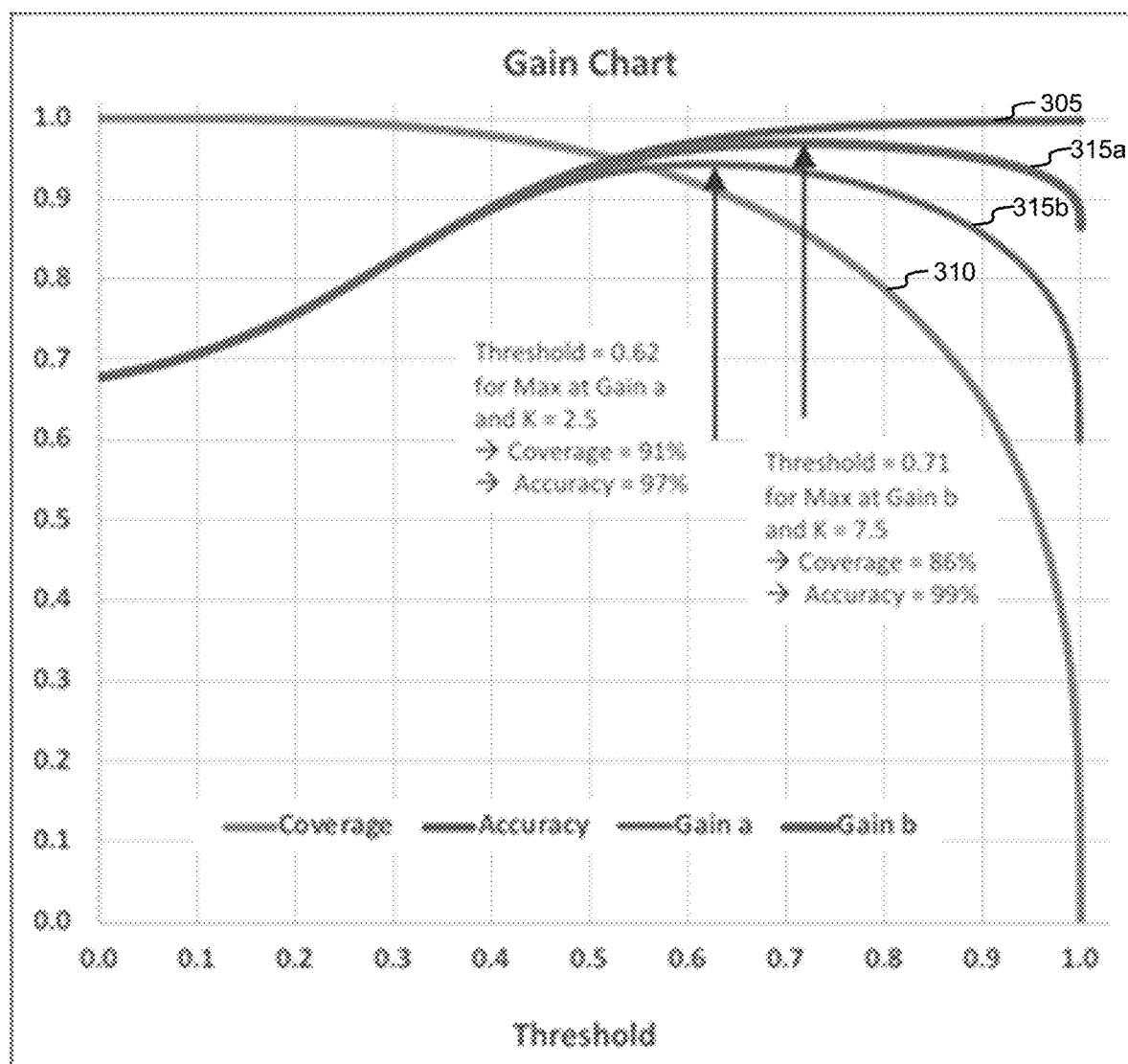
FIG. 3 shows exemplary threshold-related functions that threshold controller may evaluate to select a confidence-metric threshold for a field.

FIG. 3 shows exemplary threshold-related functions that threshold controller 156 may evaluate to select a confidence-metric threshold for a field. More specifically, a threshold-accuracy relationship is shown to gradually increase across preliminary confidence-metric thresholds, whereas a threshold-coverage relationship is shown to gradually decrease across preliminary confidence-metric thresholds. Two gain functions are shown: a first gain function 315a is associated with a relative loss parameter of K=7.5, while a second gain function 315b is associated with a relative loss parameter of K=2.5. Thus, the relative loss parameters indicate that higher loss would be incurred for generating auto-complete values remedying auto-complete errors (relative to a loss of a human user determining and entering a value) in a circumstance associated with first gain function 315a relative to a circumstance associated with second gain function 315b.

Threshold controller 156 evaluates each gain function 315a, 315b to detect a maximum. The maximum of first gain function 315a is associated with a confidence-metric threshold of 0.71, while the maximum of second gain function 315b is associated with a confidence-metric threshold of 0.62. That is, the higher relative cost associated with auto-completed values for first gain function 315a results in threshold controller 156 selecting a confidence-metric threshold that results in requiring a higher confidence for auto-completion as compared to second gain function 315b. Threshold controller 156 stores the selected confidence-metric threshold in a confidence-metric threshold data store 158, in association with (for example) an identifier of a field and/or digital form.

When a digital form is requested or accessed (e.g., by user device 106 or client device 102, machine-learning model controller 116 can define an input data set and generate a predicted field value 115 and confidence metric 118 for each field in the digital form using a machine-learning model 112 associated with the field. For each field, an auto-complete trigger sub-system 134 can determine whether the confidence metric 118 exceeds the confidence-metric threshold associated with the field. If so, the field may be auto-populated with the predicted field value 115. Otherwise, the field may be identified with an input component to request a value from a user but without identification of the auto-completed value. For example, an input component can be configured to identify the predicted field value 115 as a default (e.g., though changeable) value. As another example, a "review" page of an interface that identifies one or more user-provided values can present each of one, more or all auto-completed value, and an editing option may allow a user to request to edit an auto-completed value. Form controller system 104 can avail, transmit or present the form with each auto-completed value to the user device 106 or client device 102.

Form controller system 104 can receive or detect input from a user or client that includes a value for each field that was not auto-completed and that potentially includes a revision to each of one or more auto-completed values. A form processor sub-system 138 may then define a form response data set to include: each auto-completed value that was not revised by a user, each user-provided revision to an auto-completed value, and each user-provided value where no auto-completed value had been provided.

Form processor sub-system 138 can then process the form response data set in accordance with a workflow, which may include one or more downstream actions. For example, the workflow may include the following downstream actions: determining one or more items to be shipped to an address, billing the user for the one or more items, preparing the shipment, and shipping the item(s). As another example, the workflow may include the following downstream actions: preparing tax documents, coordinating payment for any amount due to the government, and billing the user for preparation of the tax documents. As yet another example, the workflow may include the following downstream actions: characterizing a type of data analysis being requested by a user, collecting or retrieving a data set identified by a user, processing the data set in accordance with the data analysis, and returning a result to the user. As still another example, the workflow may include the following downstream actions: estimating an operational problem with a device, determining how to fix the operational problem, identifying one or more parts needed for the fix, ordering the parts, and shipping the parts to the user.

Exemplary Process for Controlling Form Auto-Completions

Figure 4:
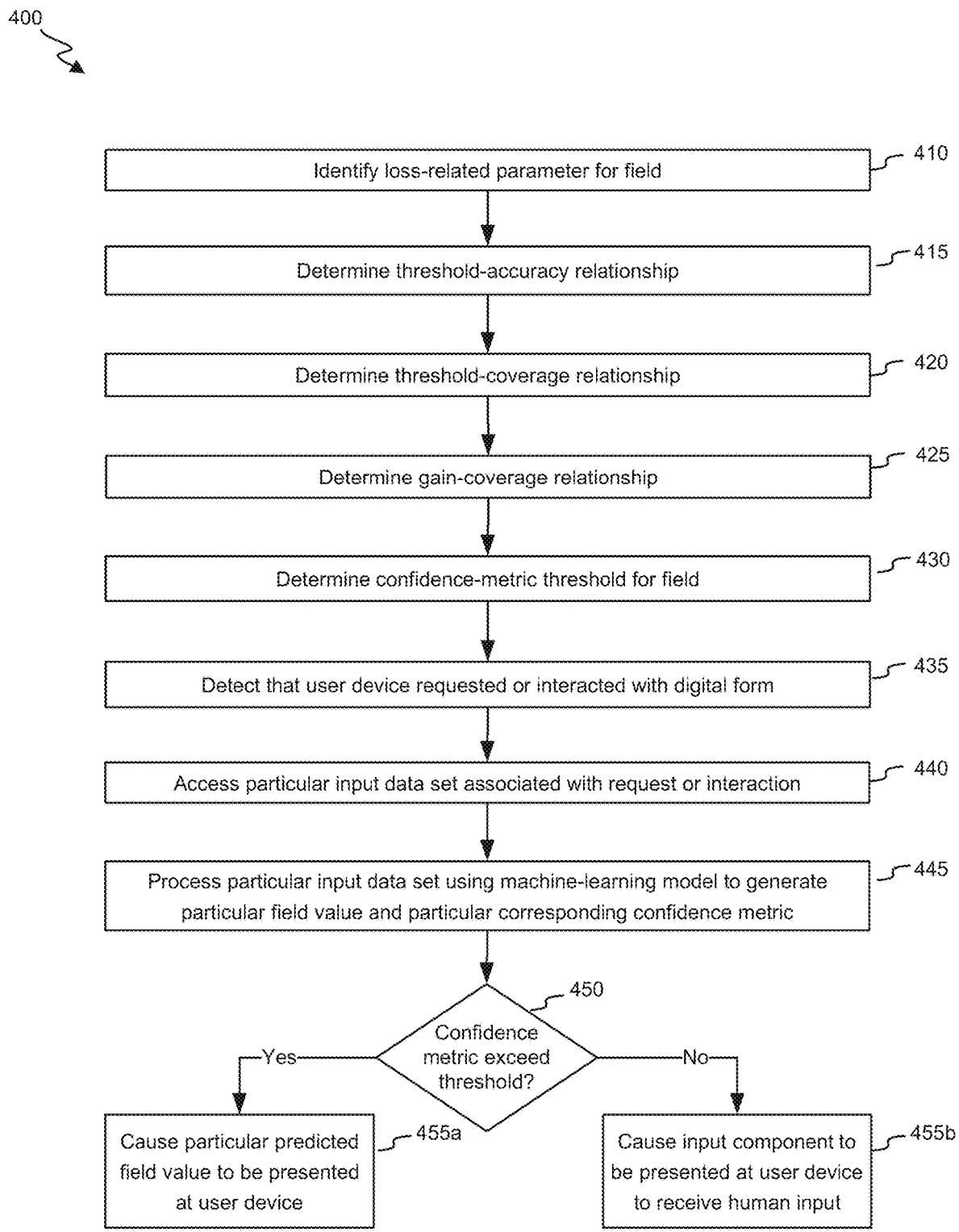
FIG. 4 illustrates an exemplary process for controlling auto-completions of fields in a digital form according to some embodiments of the invention.

FIG. 4 illustrates an exemplary process 400 for controlling auto-completions of fields in a digital form according to some embodiments of the invention. Process 400 may be performed (for example) by form controller system 104. Part or all of process 400 may be completed for each field in the digital form.

Process 400 begins at block 410 where loss-collection interface controller 142 identifies a loss-related parameter for a field. The loss-related parameter may include a relative-loss parameter, which may identify a ratio of a loss associated with providing an auto-completed value (and handling any erroneous auto-completed values) relative to a loss of having a human user determine and enter a value for the field. The loss-related parameter may (for example) instead relate to a difference between a loss associated with providing an auto-completed value (and handling any erroneous auto-completed values) and a loss of having a human user determine and enter a value for the field. The loss-related parameter may include merely a loss associated with providing an auto-completed value (and handling any erroneous auto-completed values).

At block 415, accuracy monitor 152 determines a threshold-accuracy relationship. The threshold-accuracy relationship can indicate how an accuracy of predicted values depends on preliminary confidence-metric thresholds. More specifically, for each element in a training or validation data set, a machine-learning model can generate a predicted value for the field and a confidence metric using an input data set associated with the element. For each preliminary confidence-metric threshold, accuracy monitor 152 can identify the predicted values that are associated with confidence metrics that exceed the preliminary confidence metric threshold and determine an accuracy of the predicted values. The threshold-accuracy relationship may include multiple pairs of preliminary confidence-metric thresholds and accuracies or a relationship that was defined by fitting the paired data.

At block 420, coverage monitor 154 determines a threshold-coverage relationship. The threshold-coverage relationship can indicate how a coverage of predicted values depends on preliminary confidence-metric thresholds. More specifically, for each preliminary confidence-metric threshold, coverage monitor 154 can determine what fraction of predicted values within a training or validation data set are associated with confidence metrics that exceed the preliminary confidence metric threshold. The threshold-accuracy relationship may include multiple pairs of preliminary confidence-metric thresholds and coverage metrics or a relationship that was defined by fitting the paired data.

At block 425, threshold controller 156 determines a gain-coverage relationship. The gain-coverage relationship can depend on the loss-related parameter, the threshold-accuracy relationship, and/or the threshold-coverage relationship. More particularly, the gain-coverage relationship can be configured to facilitate identifying a particular preliminary confidence metric threshold that balances competing objectives for high accuracy and high coverage using the loss-related parameter, which may indicate how important high accuracy is for a given field. The gain-coverage relationship may be defined based on an equation or function disclosed herein, such as Eqn. 4.

At block 430, threshold controller 156 determines a confidence-metric threshold for the field. The confidence-metric threshold may be defined to be equal to the preliminary confidence-metric threshold associated with a maximum gain in the gain-coverage relationship.

At block 435, auto-complete trigger sub-system 134 detects that a user has requested or interacted with a digital form that includes the field. For example, auto-complete trigger sub-system 134 may be part of a web server that receives an HTTP request for a webpage that includes the form. As another example, auto-complete trigger sub-system 134 may be a part of locally operating software that detects that a user has selected an icon that corresponds to a request for a field. As yet another example, auto-complete trigger sub-system 134 may be part of or a remote or local system that detects that a user has completed a first portion of the digital form (e.g., which need not include any fields for which auto-completion is potentially available) and is moving to (e.g., scrolling towards and navigating to a page) another portion of the digital form that has the field.

At block 440, auto-complete trigger sub-system 134 accesses a particular input data associated with the request or interaction. The particular input data set may include (for example) information that was included in a request for the digital form, information included in or associated with an account corresponding to a user requesting or interacting with the account, information detected about a local environment (e.g., when XX is operating at a user device), one or more field values previously provided by or accepted by the user, etc.

At block 445, machine-learning model controller 116 processes the particular input data set using a machine-learning model to generate a particular field value and a particular confidence metric. The machine-learning model may be the same machine-learning model used to generate predicted field values that were assessed to determine the threshold-accuracy relationship at block 415. The machine-learning model may include (for example) a natural language processing model, a regression model (e.g., a logistic regression model), a neural network, a graph network, a random-forest model, a decision tree, etc.

At block 450, auto-complete trigger sub-system 134 determines whether the particular confidence metric exceeds the confidence-metric threshold for the field determined at block 430. If so, process 400 proceeds to block 455*a*, where auto-complete trigger sub-system 134 causes the particular predicted field value to be presented as an auto-completed value at the user device. The particular predicted field value may be presented as part of the digital form. The particular predicted field value may be presented as a default value in an input component. For example, the particular predicted value may be presented as text or a number in a text box, a default selection of a set of radio buttons or a drop-down menu, a default position of a marker on a slider bar, etc. The presentation may nonetheless allow the user to provide input that revises or overrides the particular predicted field value.

If the particular confidence metric does not exceed the confidence-metric threshold, process 400 proceeds to block 455*b*, where auto-complete trigger sub-system 134 causes an input component to be presented at the user device to receive human input that identifies a value for the field. Block 455*b* can include refraining from presenting the particular field value predicted by the machine-learning model.

Example Systems for Real-Time Deployment Management

Figure 5:
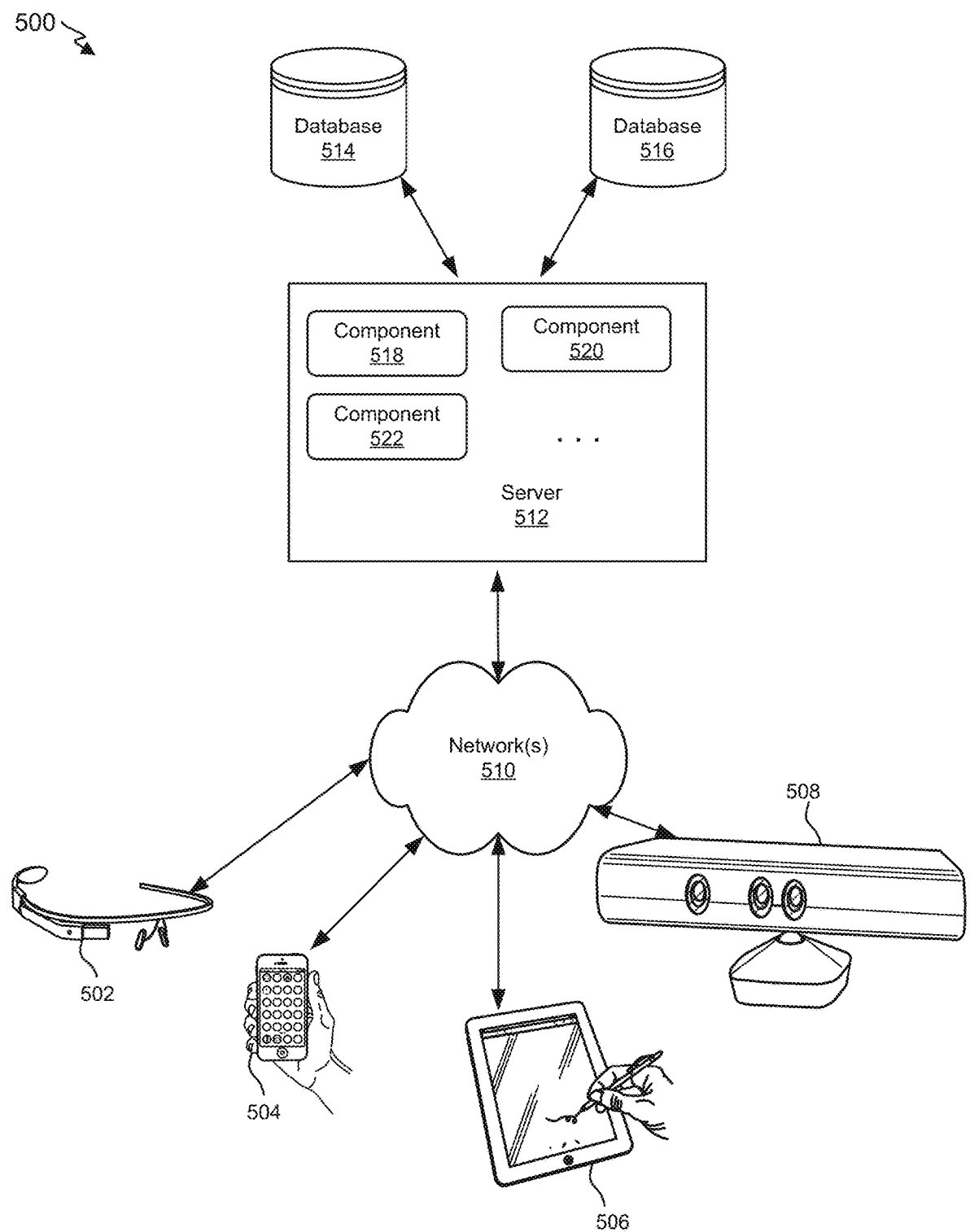
FIG. 5 depicts a simplified diagram of a distributed system for implementing one of the embodiments.

FIG. 5 depicts a simplified diagram of a distributed system 500 for implementing one of the embodiments. In the illustrated embodiment, distributed system 500 includes one or more user computing devices 502 and 504 and one or more client computing devices 506 and 508, which are configured to execute and operate a client application such as a web browser, proprietary client (e.g., Oracle Forms), or the like over one or more network(s) 510. Server 512 may be communicatively coupled with remote user computing devices 502 and 504 and with remote client computing devices 506 and 508 via network 510.

In various embodiments, server 512 may be adapted to run one or more services or software applications provided by one or more of the components of the system. In various embodiments, these services (e.g., determining auto-complete fields and/or processing form data) may be offered as web-based or cloud services or under a Software as a Service (SaaS) model to clients using client computing devices 506 and/or 508. Further, these services may include availing or facilitating in the availing of a digital form to user devices 502 and/or 504 (and determining which predicted field values to include in the availed form) and/or processing form response data sets determined based on input received at user devices 502 and/or 504. Clients operating client computing devices 506 and/or 508 and users operating user computing devices 502 and/or 504 may in turn utilize one or more client applications and/or one or more user interactions to interact with server 512 to utilize the services provided by these components.

In the configuration depicted in the figure, the software components 518, 520 and 522 of system 500 (e.g., that determine whether to present an auto-completed field value and/or which auto-completed field values to provide) are shown as being implemented on server 512. In other embodiments, one or more of the components of system 500 and/or the services provided by these components may also be implemented by user computing devices 502 and/or 504 or client computing devices 506 and/or 508. These components may be implemented in hardware, firmware, software, or combinations thereof. It should be appreciated that various different system configurations are possible, which may be different from distributed system 500. The embodiment shown in the figure is thus one example of a distributed system for implementing an embodiment system and is not intended to be limiting.

User computing device 502 and/or 504 and/or client computing device 506 and/or 508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. User computing device 502 and/or 504 and/or client computing device 506 and/or 508 can be a general purpose personal computer including, by way of example, a personal computer or laptop computer running various versions of Microsoft Windows®, Apple Macintosh®, and/or Linux operating systems. User computing device 502 and/or 504 and/or client computing device 506 and/or 508 can be a workstation computer running any of a variety of commercially-available UNIX® or UNIX-like operating systems, including without limitation the variety of GNU/Linux operating systems, such as for example, Google Chrome OS. Alternatively, or in addition, user computing device 502 and/or 504 and/or client computing device 506 and/or 508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 510.

Although exemplary distributed system 500 is shown with two user computing devices and two client computing devices, any number of user computing devices and any number of client computing devices may be supported. Other devices, such as devices with sensors, etc., may interact with server 512.

Network(s) 510 in distributed system 500 may be any type of network familiar to those skilled in the art that can support data communications using any of a variety of commercially available protocols, including without limitation TCP/IP (transmission control protocol/Internet protocol), SNA (systems network architecture), IPX (Internet packet exchange), AppleTalk, and the like. Merely by way of example, network(s) 510 can be a local area network (LAN), such as one based on Ethernet, Token-Ring and/or the like. Network(s) 510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 512 may be adapted to run one or more services or software applications described in the foregoing disclosure. For example, server 512 may correspond to a server for performing processing described above according to an embodiment of the present disclosure.

Server 512 may run an operating system including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 512 may include one or more applications to perform an operation disclosed herein, such as an application disclosed in relation to FIG. 1 and/or FIG. 4. Server 512 may include (for example) part or all of: value prediction sub-system 110, loss prediction sub-system 120, threshold-selection sub-system 150, auto-complete trigger sub-system 134 and/or form processor sub-system 138.

Distributed system 500 may also include one or more databases 514 and 516. Databases 514 and 516 may reside in a variety of locations. By way of example, one or more of databases 514 and 516 may reside on a non-transitory storage medium local to (and/or resident in) server 512. Alternatively, databases 514 and 516 may be remote from server 512 and in communication with server 512 via a network-based or dedicated connection. In one set of embodiments, databases 514 and 516 may reside in a storage-area network (SAN). Similarly, any necessary files for performing the functions attributed to server 512 may be stored locally on server 512 and/or remotely, as appropriate. In one set of embodiments, databases 514 and 516 may include relational databases, such as databases provided by Oracle, that are adapted to store, update, and retrieve data in response to SQL-formatted commands. Databases 514 and 516 may include (for example) data used to generated input data sets that are processed by machine-learning model 112, training data that is used to train machine-learning model 112, and/or data (e.g., training or validation data) that is used to identify a confidence-metric threshold.

Figure 6:
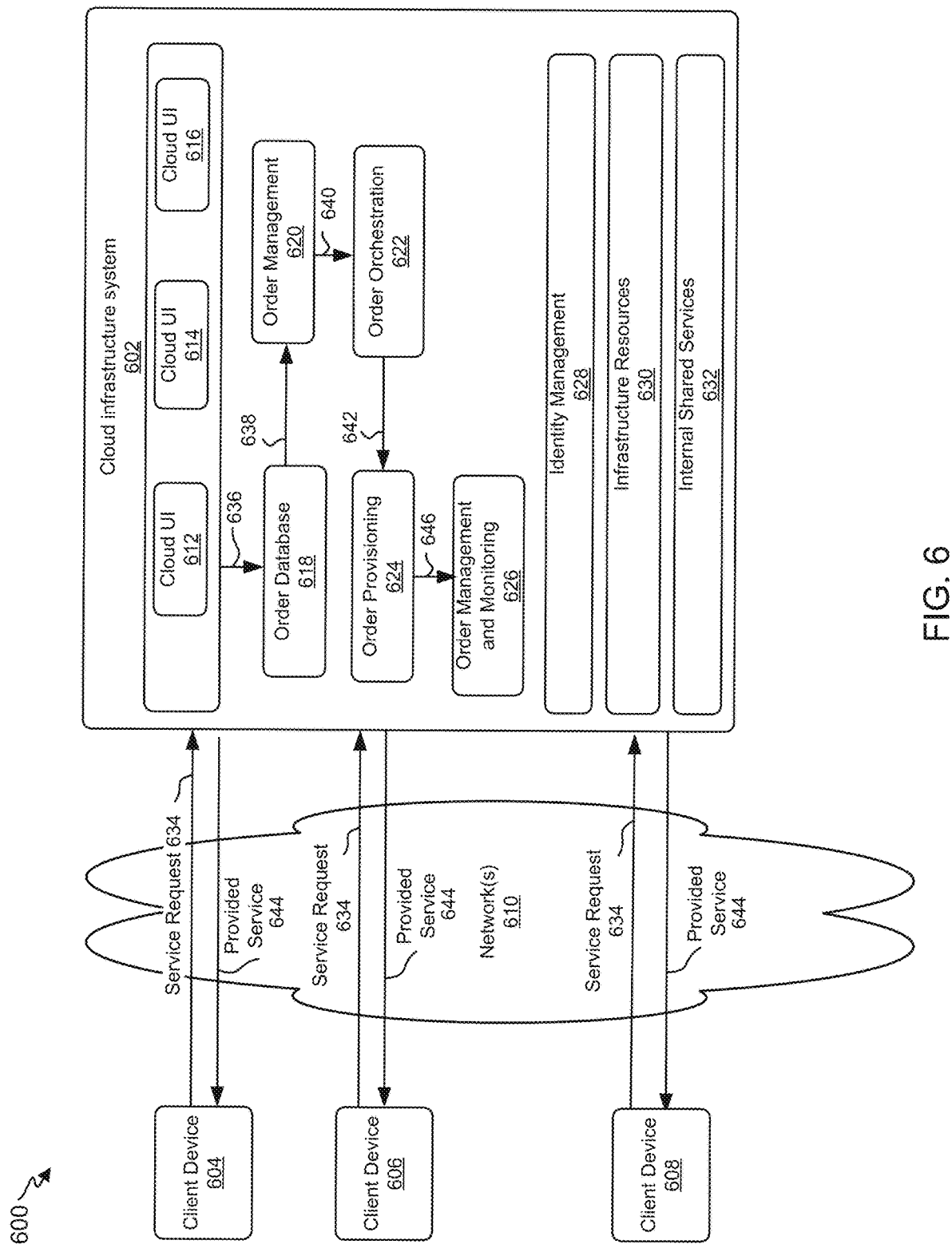
FIG. 6 is a simplified block diagram of components of a system environment by which services provided by the components of an embodiment system may be offered as cloud services, in accordance with an embodiment of the present disclosure.

FIG. 6 is a simplified block diagram of one or more components of a system environment 600 by which services provided by one or more components of an embodiment system may be offered as cloud services, in accordance with an embodiment of the present disclosure. In the illustrated embodiment, system environment 600 includes one or more user computing devices 604 and 606 and one or more client computing devices 608 that may be used by users to interact with a cloud infrastructure system 602 that provides cloud services. The user computing devices 604 and 606 may be configured to use a user application, such as one provided via a webpage that is provided by a web browser controlled by cloud infrastructure system. The client computing devices 608 may be configured to operate a client application such as a web browser, a proprietary client application (e.g., Oracle Forms), or some other application, which may be used by a user of the client computing device to interact with cloud infrastructure system 602 to use services provided by cloud infrastructure system 602.

It should be appreciated that cloud infrastructure system 602 depicted in the figure may have other components than those depicted. Further, the embodiment shown in the figure is only one example of a cloud infrastructure system that may incorporate an embodiment of the invention. In some other embodiments, cloud infrastructure system 602 may have more or fewer components than shown in the figure, may combine two or more components, or may have a different configuration or arrangement of components.

User and client computing devices 604, 606, and 608 may be devices similar to those described above for 502, 504, 506, and 508.

Although exemplary system environment 600 is shown with two user computing devices and one client computing device, any number of user and client computing devices may be supported. Other devices such as devices with sensors, etc. may interact with cloud infrastructure system 602.

Network(s) 610 may facilitate communications and exchange of data between user computing devices 604 and 606 and cloud infrastructure system 602 and between client computing device 608 and cloud infrastructure system 602. Each network may be any type of network familiar to those skilled in the art that can support data communications using any of a variety of commercially-available protocols, including those described above for network(s) 610.

Cloud infrastructure system 602 may comprise one or more computers and/or servers that may include those described above for server 512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. A service provided by the cloud infrastructure system can include performing one or more actions disclosed herein (e.g., one or more actions disclosed as being performed or potentially being performed by form controller system 104 or by a component thereof). A service provided by the cloud infrastructure system may include providing a digital form and processing values of fields in a partly or fully completed digital form. A service provided by the cloud infrastructure system may include selectively determining whether to auto-complete individual fields and to also determine a value for each field that is to be auto-completed. Thus, a provided digital form can include one or more auto-completed values.

Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 602 may be adapted to automatically provision, manage and track a customer's subscription to services offered by cloud infrastructure system 602. Cloud infrastructure system 602 may provide the cloud services via different deployment models. For example, services may be provided under a public cloud model in which cloud infrastructure system 602 is owned by an organization selling cloud services (e.g., owned by Oracle) and the services are made available to the general public or different industry enterprises. As another example, services may be provided under a private cloud model in which cloud infrastructure system 602 is operated solely for a single organization and may provide services for one or more entities within the organization. The cloud services may also be provided under a community cloud model in which cloud infrastructure system 602 and the services provided by cloud infrastructure system 602 are shared by several organizations in a related community. The cloud services may also be provided under a hybrid cloud model, which is a combination of two or more different models.

In various embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 602. Cloud infrastructure system 602 then performs processing to provide the services in the customer's subscription order.

In various embodiments, the services provided by cloud infrastructure system 602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, clients can utilize applications executing on the cloud infrastructure system. Clients can acquire the application services without the need for customers to purchase separate licenses and support. Various different SaaS services may be provided. Examples include, without limitation, services that provide solutions for sales performance management, enterprise integration, and business flexibility for large organizations.

In various embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Clients can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, clients can employ programming languages and tools supported by the cloud infrastructure system and also control the deployed services. In various embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 602 may also include infrastructure resources 630 for providing the resources used to provide various services to clients of the cloud infrastructure system. In one embodiment, infrastructure resources 630 may include pre-integrated and optimized combinations of hardware, such as servers, storage, and networking resources to execute the services provided by the PaaS platform and the SaaS platform.

In various embodiments, resources in cloud infrastructure system 602 may be shared by multiple clients and/or multiple users and dynamically re-allocated per demand. Additionally, resources may be allocated to clients and/or users in different time zones. For example, cloud infrastructure system 630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 632 may be provided that are shared by different components or modules of cloud infrastructure system 602 and by the services provided by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 602 may provide comprehensive management of cloud services (e.g., SaaS, PaaS, and IaaS services) in the cloud infrastructure system.

In one embodiment, as depicted in the figure, cloud management functionality may be provided by one or more modules, such as an order management module 620, an order orchestration module 622, an order provisioning module 624, an order management and monitoring module 626, and an identity management module 628. These modules may include or be provided using one or more computers and/or servers, which may be general purpose computers, specialized server computers, server farms, server clusters, or any other appropriate arrangement and/or combination.

In exemplary operation 634, a user using a user device, such as user device 604 or 606, may interact with cloud infrastructure system 602 by requesting one or more services provided by cloud infrastructure system 602 and placing an order for a subscription for one or more services offered by cloud infrastructure system 602. The order may be placed using a digital form that was initially provided to the user with one or more auto-completed values in response to cloud infrastructure system 602 having determined that the confidence metrics associated with the fields exceeded corresponding confidence-metric thresholds.

In certain embodiments, the user may access a cloud User Interface (UI), cloud UI 612, cloud UI 614 and/or cloud UI 616 and place a subscription order via these UIs. The order information received by cloud infrastructure system 602 in response to the customer placing an order may include information identifying the customer and one or more services offered by the cloud infrastructure system 602 that the customer intends to subscribe to.

After an order has been placed by the customer, the order information is received via the cloud UIs, 612, 614 and/or 616.

At operation 636, the order is stored in order database 618. Order database 618 can be one of several databases operated by cloud infrastructure system 618 and operated in conjunction with other system elements.

At operation 638, the order information is forwarded to an order management module 620. In some instances, order management module 620 may be configured to perform billing and accounting functions related to the order, such as verifying the order, and upon verification, booking the order.

At operation 640, information regarding the order is communicated to an order orchestration module 622. Order orchestration module 622 may utilize the order information to orchestrate the provisioning of services and resources for the order placed by the customer. In some instances, order orchestration module 622 may orchestrate the provisioning of resources to support the subscribed services using the services of order provisioning module 624.

In certain embodiments, order orchestration module 622 enables the management of business processes associated with each order and applies business logic to determine whether an order should proceed to provisioning. At operation 642, upon receiving an order for a new subscription, order orchestration module 622 sends a request to order provisioning module 624 to allocate resources and configure those resources needed to fulfill the subscription order. Order provisioning module 624 enables the allocation of resources for the services ordered by the customer. Order provisioning module 624 provides a level of abstraction between the cloud services provided by cloud infrastructure system 600 and the physical implementation layer that is used to provision the resources for providing the requested services. Order orchestration module 622 may thus be isolated from implementation details, such as whether or not services and resources are actually provisioned on the fly or pre-provisioned and only allocated/assigned upon request.

At operation 644, once the services and resources are provisioned, a notification of the provided service may be sent to users on user devices 604 and/or 606 by order provisioning module 624 of cloud infrastructure system 602.

At operation 646, the user's order may be managed and tracked by an order management and monitoring module 626. In some instances, order management and monitoring module 626 may be configured to collect usage statistics for the services in the order, such as the amount of storage used, the amount data transferred, the number of users, and the amount of system up time and system down time.

In certain embodiments, cloud infrastructure system 600 may include an identity management module 628. Identity management module 628 may be configured to provide identity services, such as access management and authorization services in cloud infrastructure system 600. In various embodiments, identity management module 628 may control information about users and/or clients who wish to utilize the services provided by cloud infrastructure system 602. Such information can include information that authenticates the identities of such users and/or clients and information that describes which actions those customers are authorized to perform relative to various system resources (e.g., files, directories, applications, communication ports, memory segments, etc.) Identity management module 628 may also include the management of descriptive information about each user and/or client and about how and by whom that descriptive information can be accessed and modified.

Figure 7:
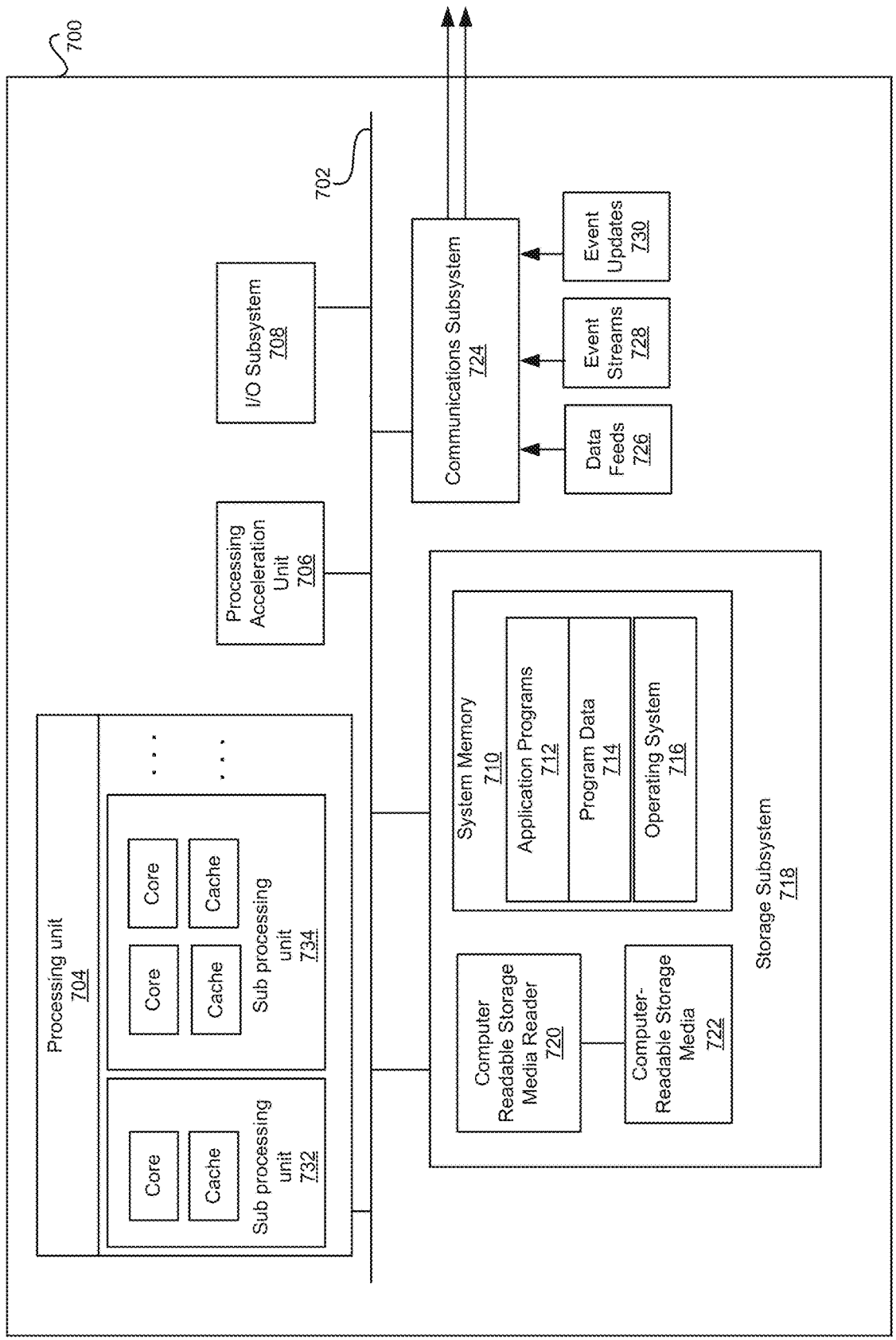
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above (e.g., client device 102, form controller system 104, or user device 106). As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 1204 and/or in storage subsystem 718. Through suitable programming, processing unit(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 718 may also include a computer-readable storage media reader 1220 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In various embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
accessing a machine-learning model that transforms an input data set into a predicted field value for a field in a digital form and a corresponding confidence metric;
accessing client data that includes or was derived from one or more client inputs received from a client device via an interface, wherein, for each individual field of a set of fields in the digital form, the client data corresponds to an individual relative-loss parameter for the individual field or corresponds to a loss underlying the individual relative-loss parameter, wherein the set of fields includes the field, and wherein the relative-loss parameter is identified based on the client data;
identifying, based on the client data that includes or is derived from one or more client inputs received from the client device via the interface, a relative-loss parameter for the field that represents a loss of responding to an inaccurate predicted field value for the field relative to a loss corresponding to a human user providing a field value for the field, wherein the loss of responding to the inaccurate predicted field value is based on a predicted time to remedy the inaccurate predicted field value, and wherein the loss corresponding to the human user providing the field value is based on a predicted time for determining and entering the field value into the digital form;
determining, based on the relative-loss parameter for the field, a confidence-metric threshold for auto-completion of the field;
detecting that a user device has sent a request for or interacted with the digital form;
accessing a particular input data set associated with the request or interaction;
processing the particular input data set using the machine-learning model to generate:
a particular predicted field value for the field; and
a particular corresponding confidence metric for the field;
determining that the particular corresponding confidence metric exceeds the confidence-metric threshold for the field, thereby predicting that a total predicted cost for auto-completion of the field exceeds a total predicted cost for manual entry for the field; and
in response to the determination, causing the particular predicted field value to be presented at the user device.

2. The computer-implemented method of claim 1, further comprising:
processing the particular input data set or another particular input data set associated with the request for or interaction with the digital form using the machine-learning model to generate:
another particular predicted field value for the field; and
another particular corresponding confidence metric;
determining whether the other particular corresponding confidence metric exceeds a different confidence-metric threshold; and
causing the other particular predicted field value to be presented at the user device when it is determined that the other particular corresponding confidence metric exceeds the different confidence-metric threshold.

3. The computer-implemented method of claim 1, further comprising:
providing the interface to the client device.

4. The computer-implemented method of claim 3, wherein the interface includes a particular input component configured to receive a client input that predicts an extent to provision of an auto-completed inaccurate field value for a particular field is more costly than user provision of a value for the particular field.

5. The computer-implemented method of claim 3, wherein an input component of the one or more input components associated with the field includes a slider bar.

6. The computer-implemented method of claim 3, wherein an input component of the one or more input components associated with the field includes a menu or list of categories of loss or of categories of the relative-loss parameter.

7. The computer-implemented method of claim 1, wherein the loss of responding to the inaccurate predicted field value is calculated based on a set of predicted probabilities, each probability of the set of predicted probabilities representing a likelihood that an inaccuracy of the field value will lead to a corresponding event.

8. The computer-implemented method of claim 1, wherein the predicted time for remedying the inaccurate predicted field value is determined based on a predicted time for the human user to correct the inaccurate predicted field value.

9. The computer-implemented method of claim 1, wherein the predicted time for remedying the inaccurate predicted field value is determined based on a predicted time for remedying a particular type of downstream action triggered by the inaccurate predicted field value.

10. The computer-implemented method of claim 1, further comprising:
determining a probability of the human user correcting the inaccurate predicted field value;
determining a probability of occurrence of a particular type of downstream action triggered by the inaccurate predicted field value; and
calculating the loss of responding to the inaccurate predicted field value for the field based on the probability of the human user correcting the inaccurate predicted field value, the predicted time of the human user correcting the inaccurate predicted field value, the probability of occurrence of the downstream action trigged by the inaccurate predicted field value, and the predicted time for remedying the downstream action.

11. The computer-implemented method of claim 10, wherein the particular type of downstream action included an error in a shipment, and wherein the loss of responding to the inaccurate predicted field value is based on:
a time commitment for engaging in one or more communications about the error; and
a cost of providing and shipping an object to compensate for the error.

12. The computer-implemented method of claim 10, wherein the loss of responding to the inaccurate predicted field value is determined by:
multiplying the predicted time of the human user correcting the inaccurate predicted field value by a predicted rate of the human user to obtain an interim result; and
adding the interim result to a cost of remedying the particular type of downstream action triggered by the inaccurate predicted field value.

13. The computer-implemented method of claim 1, further comprising:
generating a threshold-accuracy relationship between preliminary confidence-metric thresholds and accuracies of predicted field values generated by the machine-learning model with corresponding confidence metrics exceeding the confidence-metric threshold, wherein the confidence-metric threshold for the field is further based on the threshold-accuracy relationship.

14. The computer-implemented method of claim 1, further comprising:
generating a threshold-coverage relationship between preliminary confidence-metric thresholds and coverages of predicted field values generated by the machine-learning model, wherein each of the coverages represents a portion of predicted field values that exceed a corresponding preliminary confidence-metric threshold, wherein the confidence-metric threshold for the field is further based on the threshold-coverage relationship.

15. The computer-implemented method of claim 1, wherein the machine-learning model includes a natural language processing model, a decision tree, or a random-forest model.

16. The computer-implemented method of claim 1, wherein the machine-learning model includes a neural network, a graph network, or a regression model.

17. The computer-implemented method of claim 1, wherein the particular corresponding confidence metric is a categorical value.

18. A system comprising:
one or more data processors; and
a non-transitory computer-readable storage medium containing instructions that, when executed on the one or more data processors, cause the one or more data processors to perform a set of operations including:
accessing a machine-learning model that transforms an input data set into a predicted field value for a field in a digital form and a corresponding confidence metric;
accessing client data that includes or was derived from one or more client inputs received from a client device via an interface, wherein, for each individual field of a set of fields in the digital form, the client data corresponds to an individual relative-loss parameter for the individual field or corresponds to a loss underlying the individual relative-loss parameter, wherein the set of fields includes the field, and wherein the relative-loss parameter is identified based on the client data;
identifying, based on one or more client inputs received from a client device via an interface, a relative-loss parameter for the field that represents a loss of responding to an inaccurate predicted field value for the field relative to a loss corresponding to a human user providing a field value for the field, wherein the loss of responding to the inaccurate predicted field value is based on a predicted time to remedy the inaccurate predicted field value, and wherein the loss corresponding to the human user providing the field value is based on a predicted time for determining and entering the field value into the digital form;
determining, based on the relative-loss parameter for the field, a confidence-metric threshold for auto-completion of the field;
detecting that a user device has requested or interacted with the digital form;
accessing a particular input data set associated with the request or interaction;

processing the particular input data set using the machine-learning model to generate:
   a particular predicted field value for the field; and
   a particular corresponding confidence metric for the field;
determining that the particular corresponding confidence metric exceeds the confidence-metric threshold for the field, thereby predicting that a total predicted cost for auto-completion of the field exceeds a total predicted cost for manual entry for the field; and
in response to the determination, causing the particular predicted field value to be presented at the user device.

19. The system of claim 18, wherein the set of operations further includes:
providing the interface to the client device.

20. A computer-program product tangibly embodied in a non-transitory machine-readable storage medium, including instructions configured to cause one or more data processors to perform a set of operations including:
accessing a machine-learning model that transforms an input data set into a predicted field value for a field in a digital form and a corresponding confidence metric;
accessing client data that includes or was derived from one or more client inputs received from a client device via an interface, wherein, for each individual field of a set of fields in the digital form, the client data corresponds to an individual relative-loss parameter for the individual field or corresponds to a loss underlying the individual relative-loss parameter, wherein the set of fields includes the field, and wherein the relative-loss parameter is identified based on the client data;
identifying, based on the client data that includes or is derived from one or more client inputs received from the client device via the interface, a relative-loss parameter for the field that represents a loss of responding to an inaccurate predicted field value for the field relative to a loss corresponding to a human user providing a field value for the field, wherein the loss of responding to the inaccurate predicted field value is based on a predicted time to remedy the inaccurate predicted field value, and wherein the loss corresponding to the human user providing the field value is based on a predicted time for determining and entering the field value into the digital form;
determining, based on the relative-loss parameter for the field, a confidence-metric threshold for auto-completion of the field;
detecting that a user device has requested or interacted with the digital form;
accessing a particular input data set associated with the request or interaction;
processing the particular input data set using the machine-learning model to generate:
   a particular predicted field value for the field; and
   a particular corresponding confidence metric for the field;
determining that the particular corresponding confidence metric exceeds the confidence-metric threshold for the field, thereby predicting that a total predicted cost for auto-completion of the field exceeds a total predicted cost for manual entry for the field; and
in response to the determination, causing the particular predicted field value to be presented at the user device.

* * * * *